United States Patent [19]
Francis

[11] Patent Number: 5,170,813
[45] Date of Patent: Dec. 15, 1992

[54] TAPPING BANDS

[76] Inventor: Robert A. Francis, 3/39 Middle Street, Cleveland, 4163, Queensland, Australia

[21] Appl. No.: 790,413

[22] Filed: Nov. 12, 1991

[30] Foreign Application Priority Data

Nov. 13, 1990 [AU] Australia .................. PK3312

[51] Int. Cl.⁵ .............. F16L 41/12; F16L 41/16; F16K 43/00
[52] U.S. Cl. ...................... 137/15; 137/318; 285/197; 285/199
[58] Field of Search ............ 137/318, 15; 285/197, 285/198, 199

[56] References Cited

U.S. PATENT DOCUMENTS

| | | | |
|---|---|---|---|
| 45,964 | 1/1865 | Ball | 285/197 |
| 204,730 | 6/1878 | Hawkes | 285/197 |
| 419,974 | 1/1890 | Smith | 137/318 |
| 463,524 | 11/1891 | Madden | 137/318 |
| 511,327 | 12/1893 | Eley | 137/318 |
| 1,616,390 | 2/1927 | Powell | 285/197 |
| 1,791,385 | 2/1931 | Skuttle | 285/197 |
| 1,898,935 | 2/1933 | Brandriff | 137/318 |
| 2,911,859 | 11/1959 | Longley et al. | 137/318 |
| 3,045,511 | 7/1962 | Risley | 137/318 |
| 3,045,512 | 7/1962 | Risley et al. | 137/318 |
| 3,428,075 | 2/1969 | Wagner | 137/318 |
| 3,694,009 | 9/1972 | Phillips | 285/197 |
| 3,870,064 | 3/1975 | Vigneron | 137/318 |
| 3,999,785 | 12/1976 | Blakeley | 285/197 |
| 4,177,828 | 12/1979 | Vache | 137/318 |
| 4,638,834 | 1/1987 | Montgomery | 137/318 |

FOREIGN PATENT DOCUMENTS 185633  3/1956  Fed. Rep. of Germany ...... 285/197

Primary Examiner—George L. Walton
Attorney, Agent, or Firm—Trexler, Bushnell, Giangiorgi & Blackstone, Ltd.

[57] ABSTRACT

A tapping band allowing for interconnection of fluid conduits without any interruption to fluid flow includes means (1A and 1B) adapted, in use, to be disposed around a first pipe (2) and having an outlet (3) extending substantially normally therefrom, the outlet (3) in turn defining the locale intended for tapping. The outlet (3) includes a slot (9) for receiving and releasably retaining a sealing member, in the form of a valve blade (10). The arrangement is such that, once in position relative to the conduit (2), a suitable drilling means is employed for tapping into the conduit (2) via the outlet (3), with the valve means then acting to seal the outlet (3) once the tapping means has been withdrawn. A secondary conduit (20) can then be joined to conduit (2) in any known manner and, when joined, the valve blade (10) can be withdrawn from the slot (9), thereby allowing fluid to pass from conduit (2) into conduit (20).

14 Claims, 3 Drawing Sheets

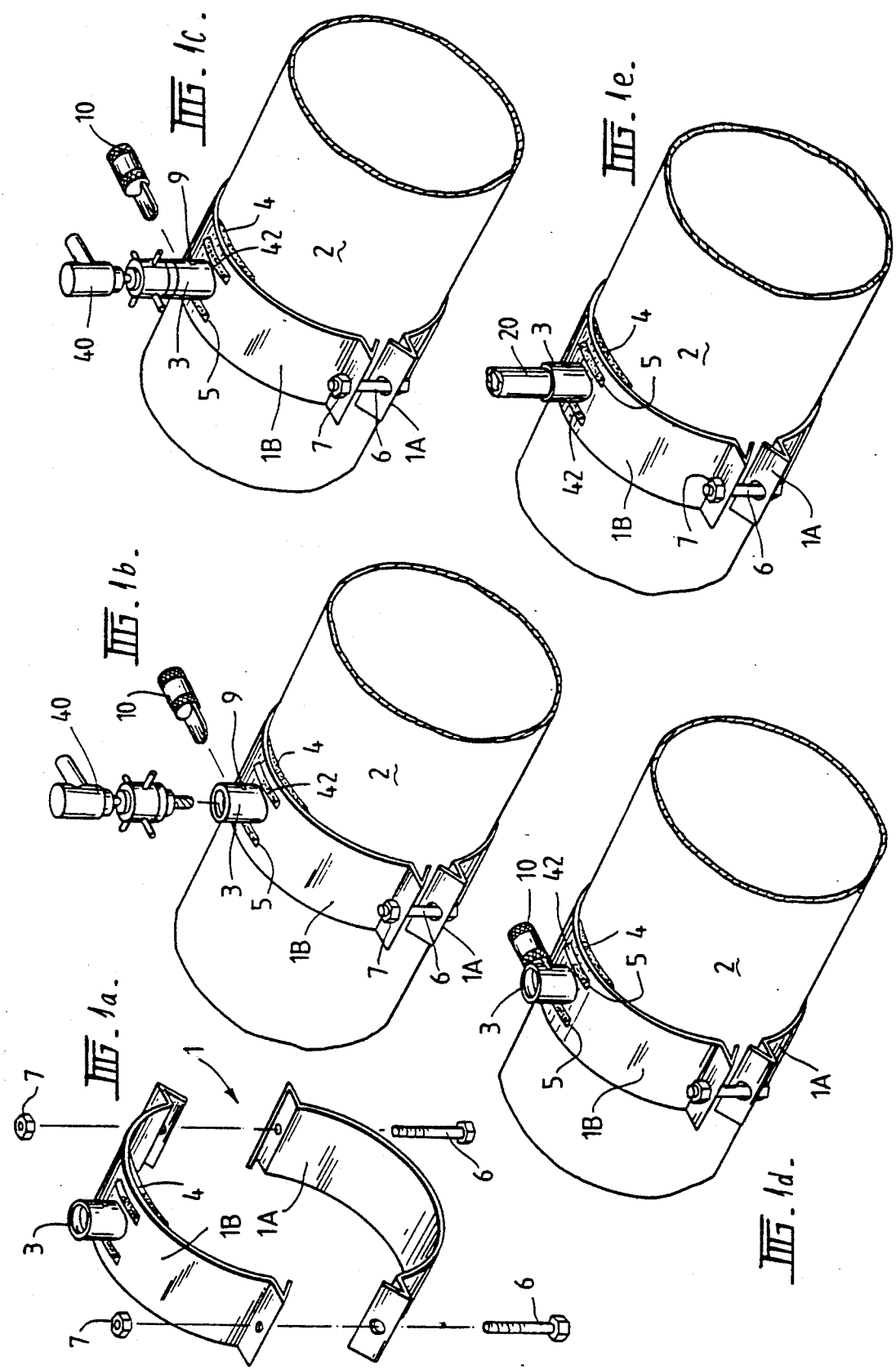

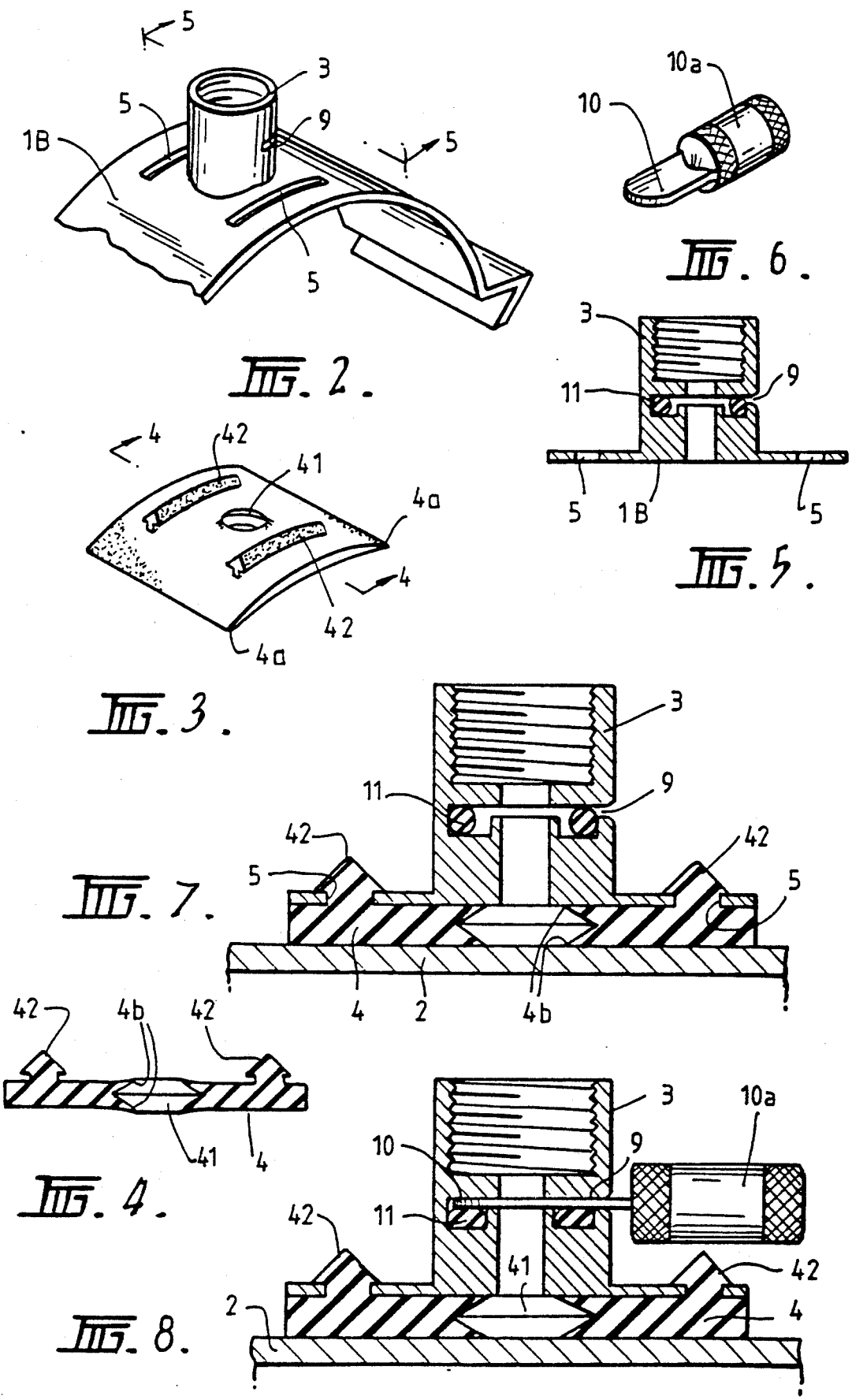

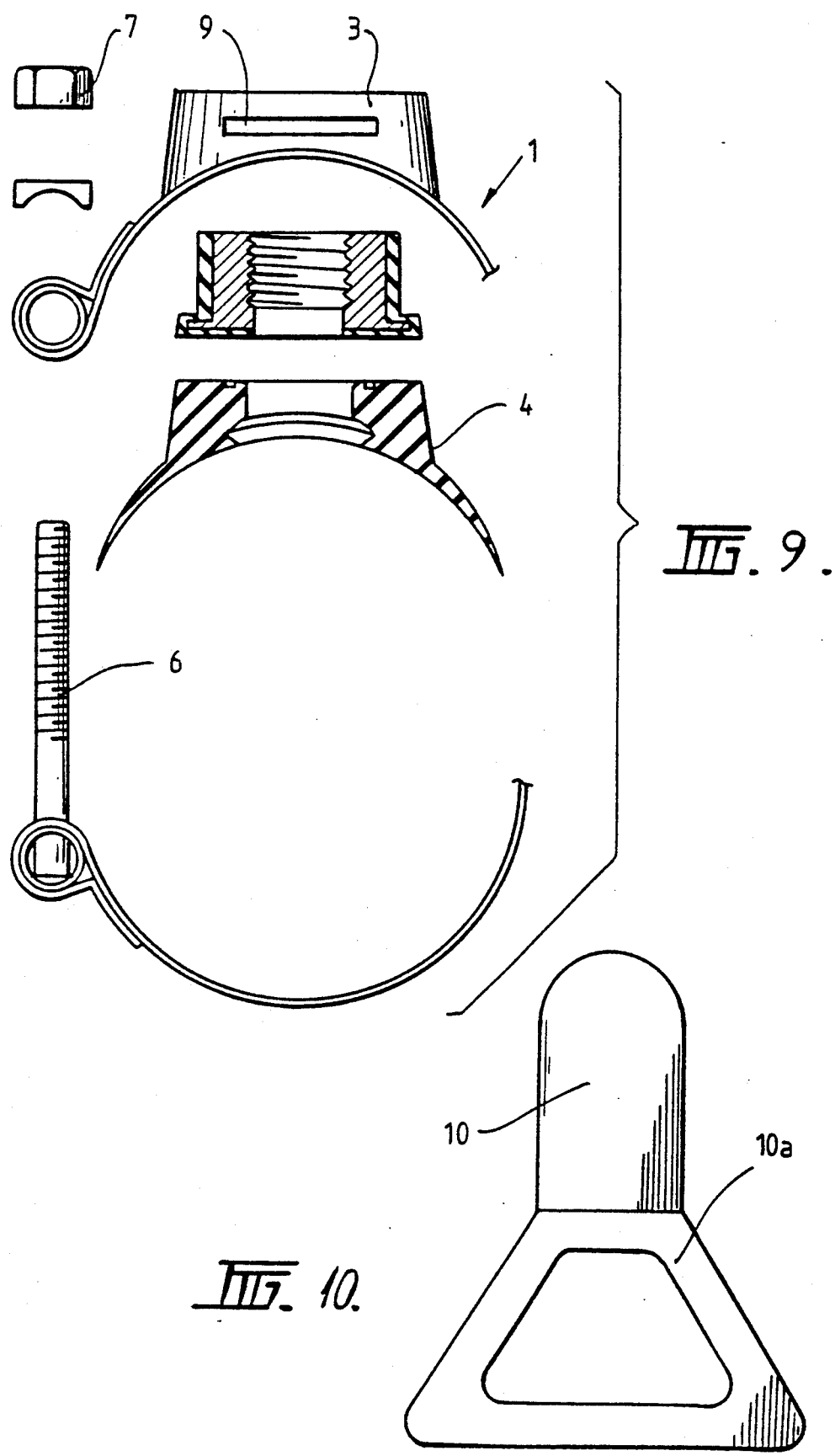

TAPPING BANDS

The present invention relates, in general terms, to improvements in so-called tapping bands for use in the field of plumbing. More particularly, but not exclusively, the present invention relates to a means which allows for tapping of a fluid pipe, conduit or the like without there being any need to first stop, or at least interrupt, the flow of fluid therethrough. In other words the arrangement in accordance with the present invention allows for a fluid pipe, conduit or the like to be tapped in situ and whilst still in use. The invention also relates to a method of tapping a fluid conduit in situ, using means or apparatus of the aforementioned type.

Nowadays, with our ever-burgeoning industrial and/or residential areas, and the resultant ever-increasing demands for the supply of fluids (in the form of water, gas or whatever), there often arises the need for tapping an existing fluid pipe, conduit or fluid-carrying means whereby to allow for connection thereto, for example, of a further conduit intended for the transport of fluid to a newly-developed and/or remote locality, or alternatively to satisfy increased demands in a previously developed or serviced locale. One commonly encountered example of such a need is the situation wherein a subsidiary line of some sort is to be attached to a main supply line whereby to allow for transport of the relevant fluid to a newly-erected building, an up-graded building or the like. In accordance with the known practices one means of tapping into an existing line necessitated the cessation or interruption of flow through that main or existing line prior to commencement of the actual tapping operation. That fact in itself gave rise to certain disadvantages, perhaps none more so than in terms of inconvenience to existing users during that time period when the flow through the main supply or existing line was interrupted.

There have also been in use, in the past, arrangements which allowed for tapping of a main or supply line, for example, whilst that main or supply line was still actually in use. Such arrangements, however, have been by their very nature rather complicated, involving a substantial number of different parts, and these arrangements were hence rather expensive to manufacture and, perhaps even more importantly, difficult and in some ways unsafe to both install and to use.

The present invention seeks to overcome the problems and disadvantages associated with the prior art by providing a means for tapping a fluid pipe, conduit or the like which is simple to manufacture, install and use, employs fewer components when compared with known and in use arrangements, and still allows for tapping of an existing fluid pipe, conduit or the like in an extremely safe way without the necessity of stopping, or even interrupting in any way, the flow of fluid therethrough. It should be realised that the invention relates not only to the overall system, but also to certain parts of and components therefor. The invention further relates to a method of tapping employing such means.

In accordance with a first aspect of the present invention there is provided apparatus for tapping a fluid pipe, conduit or the like without stopping or interrupting the flow of fluid therethrough, said apparatus including: means adapted to be engaged or disposed around said pipe, conduit or the like; and means to be interposed between said engagement means and said pipe, conduit or the like whereby to afford a seal, wherein said engagement means includes an aperture defining the intended region for tapping of said pipe, conduit or the like and whereby to allow for connection thereto of a further pipe, conduit or the like, said engagement means having extending therefrom, and surrounding said aperture, an outlet means for fluid, said outlet means having associated therewith means for sealing thereof once tapping has been completed, the arrangement being such that, when said further conduit is connected, said means for sealing of said outlet means is adapted to be removed, whereby to allow for fluid flow from said pipe, conduit or the like through said further conduit.

In accordance with a further aspect of the present invention there is provided a method of tapping an existing fluid pipe, conduit or the like without interrupting the flow of fluid therethrough, said method including: disposing a tapping band around said pipe, conduit or the like, said tapping band having outlet means extending therefrom and adapted to co-operate with a secondary conduit, said outlet means defining an intended region for tapping of said pipe, conduit or the like, said outlet means having means associated therewith for the sealing thereof; tapping said pipe, conduit or the like, using said sealing means to seal said pipe, conduit or the like once tapping has been achieved; connecting a secondary or further conduit to said pipe, conduit or the like via said outlet means; and withdrawing said sealing means whereby to allow for fluid flow into said secondary or further conduit.

In order that the invention may be more clearly understood and put into practical effect there shall now be described in detail preferred embodiments of a tapping band or means in accordance with the invention. The ensuing description is given by way of non-limitative example only and is with reference to the accompanying drawings, wherein:

FIGS. 1a to 1e inclusive are a series of views showing, in detail, the various steps involved in actual installation on an existing pipe, conduit or the like of a tapping band in accordance with the present invention;

FIG. 2 is a top perspective view of one section of a tapping band in accordance with the invention;

FIG. 3 is a top perspective view of a sealing means for use in conjunction with the tapping band of FIGS. 1 and 2;

FIG. 4 is a sectional view taken along the line 4—4 of FIG. 3;

FIG. 5 is a sectional view taken along the line 5—5 of FIG. 2;

FIG. 6 is a perspective view of a valve blade for use with the tapping band and method in accordance with the present invention;

FIG. 7 is a sectional view of a tapping band in accordance with the present invention, with the valve in its standard open position;

FIG. 8 is a view similar to FIG. 9, with the valve closed;

FIG. 9 is an enlarged, exploded view of a further arrangement/embodiment of a tapping band in accordance with the present invention; and FIG. 10 is a plan view of an alternative embodiment of a valve blade assembly in accordance with the invention.

With reference firstly to FIGS. 1a to 1e of the drawings there is illustrated therein a preferred embodiment of a tapping band in accordance with the present invention, generally designated 1, such tapping band 1 being adapted, in use, to be disposed around a pipe, conduit, or the like 2 in any known and suitable manner. In actual fact the method and/or means employed for positioning or locating the tapping band 1 in accordance with the present invention relative to the conduit 2 forms no part of the invention.

The tapping band 1 in accordance with the present invention, preferably in the form of two separate yet interconnectable segments 1A and 1B, is adapted, in use, to be disposed around a pipe or the like conduit 2, and includes an outlet 3 which is to be employed, in fact, to locate or to define the position at which the conduit 2 is to be tapped, as for example to allow for connection thereto of a subsidiary conduit 20. The tapping band 1 further has associated therewith a sealing means, generally designated 4, to be described hereinafter in more detail. The tapping band 1 further includes at least one, and preferably two, slots or apertures 5 therein, such slots or apertures 5 co-operating with the sealing means 4, in a manner also to be described hereinafter in more detail, whereby to ensure proper location and sealing of the band 1 during the actual tapping procedure, functioning to prevent sealing means 4 from being "blown out" of the overall arrangement by fluid pressure.

As shown in more detail, for example, in FIG. 3, a sealing means 4 is employed between the tapping band 1 and the conduit 2. The sealing means 4, preferably constructed from a suitable resilient material, in the preferred embodiment illustrated is tapered at each free end 4a, and includes a substantially centrally disposed aperture 41 which is adapted, in use, to co-operate with the outlet 3 of the tapping band 1. The sealing means 4 preferably also incorporates at least one, and preferably two, substantially wedge-shaped grommets 42 which are adapted, in use, to be disposed within the slots or apertures 5 of the tapping band 1, thereby assisting in locating the sealing means 4 securely and correctly in position relative to the tapping band 1, without there being any need for gluing, providing grooves or other more complicated, and hence expensive, means for securing the sealing means 4 in place against unwanted movement or separation.

The sealing means 4, by virtue of its tapered ends 4a, serves to provide a wedging action at the tapping band 1, thereby preventing the fluid pressure itself from forcing the sealing means 4 radially outwardly and away from the aperture 41 around the conduit 2. The slotted arrangement furthermore enables some type of flexible sheet material to be employed in the manufacture of the tapping band 1 itself, and provides a bulging effect after tightening and being retained to prevent the sealing means 4 from being blown out by fluid pressure lengthwise along the conduit 2. Preferably the sealing means 4 also includes lips 4b (See FIG. 7) which seal against the conduit 2 and the tapping band 1, providing an automatic seal after assembly.

In an especially preferred arrangement the sealing means 4 can be manufactured in a straight form, thereby allowing for the same size and type of sealing means to be employed for all sizes of tapping bands 1, with the sealing means 4 merely needing to be curved to suit the band radius, still being held in position by the interaction of grommets 42 and slots 5.

In the preferred embodiments illustrated the two segments 1A, 1B making up the tapping band 1 are adapted, in use, to be disposed around a conduit 2 and to be releasably secured relative thereto by means of bolts 6 and nuts 7 adapted to be disposed within mating apertures provided on each segment 1A, 1B of the tapping band 1. Separate spacer means and/or washers may be included as appropriate.

The outlet 3 of the tapping band 1 in accordance with the present invention has provided therein a slot 9 which is adapted, in use, to receive and releasably retain a valve blade 10 whereby to seal the outlet 3 once tapping has been achieved. The slot 9 has associated therewith, and retained therein, a valve sealing means 11 of any known type. In the embodiment illustrated in, for example, FIGS. 7 and 8, the slot 9 is so shaped and dimensioned as to not allow the sealing means 11 to be "blown out" under fluid pressure. The valve blade 10 preferably has associated therewith a handle portion, generally designated 10a, intended to facilitate insertion and removal thereof. In the preferred embodiments illustrated the handle portion 10a may be knurled over the entire length or merely part thereof, whereby to facilitate gripping.

In an especially preferred embodiment of the present invention the outlet 3 of the tapping band 1 incorporates a special seal, groove/slot combination intended to allow for the ready insertion thereinto of a valve blade 10 whereby to form or give rise to a particularly simple form of valving means. The outlet 3 is especially designed, as illustrated for example in the drawings, with a groove or slot 9 of a particular width and with correct dimensions whereby to provide appropriate sealing in the standard position, the arrangement being such that, once the valve blade 10 is inserted, sealing is still achieved. The slot 9 itself is small enough so as not to allow the sealing means 11 to be blown out under fluid pressure. The outlet 3, with the unique combination of the sealing means 11, the slot 9 and the blade valve 10 provides the valve means required for under-pressure tapping without necessitating any other separate valve means. Preferably this sealing means 11, slot 9 and valve blade 10 combination constitutes an integral part of the tapping band 1 in accordance with the present invention. It must be realised, however, that the self-same sealing effect could be provided with standard-type ferrules and valves. In such arrangements the outlet 3 will incorporate an integral vertical-closing type valve, together with a sealing means/slot/blade valve arrangement of the type referred to above. The outlet 3 can furthermore incorporate a swivel-type outlet secured by a retaining bonnet. Such a valve means incorporates both the sealing means/slot/blade valve arrangement of the aforementioned type and a swivel-type outlet within a single mechanism which is adapted to be inserted and used in standard-type tapping bands.

In the preferred embodiments illustrated the outlets 3 incorporate female connections. It should be noted, however, that such is not of the essence of the invention and that such outlets 3 could alternatively be provided with what might be termed a male thread or flange, or indeed any other type of means whereby to allow for interconnection with the subsidiary conduit 20.

In the alternative embodiment as shown in FIG. 9, for example, the sealing means 4 and tapping band 1 in accordance with the present invention are adapted for interconnection with a bush or bushing, generally designated 40, interposed therebetween. The bush or bushing 40, preferably constructed from moulded rubber or the like material, is internally tapped or threaded as shown, whereby to allow for a secondary conduit 20 to be received therein. In an especially preferred embodiment, not shown, a so-called half O-ring type seal is located between the bush or bushing 40 and sealing means 4, such half O-ring type seal, in use, being pressed against the outlet by the inherent resiliency of the sealing means 4, aided or augmented by the fluid pressure in the vicinity of the lips 4b of the sealing means 4. To assist in the installation of such an arrangement, the sealing means 4 may have a substantially radial slot or groove in the top thereof, such slot or groove allowing entry of the valve blade 10 to the aforementioned half O-ring type seal.

For ease of explanation, and again with reference to FIG. 1, there is set down hereinafter an indication of the procedures required in accordance with the invention to tap into an existing fluid line or conduit.

The first step involves the selection of the correct size tapping band 1 for the particular size of conduit 2 which is required to be tapped. Thereafter the tapping band 1, with associated sealing means 4, is located on the conduit 2 to be tapped in any known manner and securely fastened relative thereto, via bolts 6 and associated nuts 7. A drilling or tapping means 40 of any known type, may then be located within the outlet 3 of the tapping band 1 and a drive means of any known type, for example an electric, air or pneumatic drill, or even a hand wrench, may be employed to actually perform the cutting (tapping) through the conduit 2. Once the conduit 2 is pierced, the cutting or drilling means is extracted and the valve blade 10 is inserted into the valve blade slot 9, in conjunction with the sealing means 11, so as to isolate or close off the fluid which has by now reached the outlet of the tapping band 1. There is shown in FIG. 1d the arrangement with the drilling or cutting means removed from the tapping band 1 and the valve blade 10 inserted. Thereafter a suitable subsidiary line or conduit 20 can be located in any known manner relative to the main or supply conduit 2. Once such subsidiary conduit 20 has been connected, then the valve blade 10 may simply be removed to allow for flow of fluid from the main supply conduit 2 to the subsidiary conduit 20. If at any time flow to the subsidiary line 20 is to be interrupted, then such interruption can be achieved simply by re-inserting the valve blade 10.

Finally it should be understood that the aforegoing description refers merely to preferred embodiments of the subject invention and that variations and modifications will be possible thereto without departing from the spirit and scope of the invention, the ambit of which is to be determined from the following claims.

The claims defining the invention are as follows:

I claim:

1. Apparatus for tapping a fluid pipe, without stopping or interrupting flow of fluid therethrough, said apparatus including: engagement means adapted to be mounted around said pipe, said engagement means including an aperture defining an intended site for tapping of said pipe, and whereby to allow for connection thereto of a further pipe, discrete sealing means to be interposed between said engagement means and said pipe for sealing around said aperture, said discrete sealing means and said engagement means including interengaging means for positively retaining said discrete sealing means in an aligned predetermined desired relation about said aperture, said interengaging means comprising a first member located on said engagement means and a second member located on said discrete sealing means, one of said first and second members being interengageable with the other of said first and second members for releasably securing said discrete sealing means to said engagement means and for maintaining said discrete sealing means in said aligned predetermined relation, said engagement means having extending therefrom, and surrounding said aperture, an outlet means for fluid, said outlet means having associated therewith means for sealing thereof once tapping has been completed, such that, when said further conduit is connected to said outlet means, said means for sealing of said outlet means is adapted to be removed, whereby to allow for fluid flow from said pipe through said further conduit.

2. The apparatus as claimed in claim 1, wherein said engagement means is in the form of two co-operating members adapted, in use, to be releasably disposed around said pipe, and at least one of said co-operating members having an aperture disposed therein adapted to be located at the intended site for tapping and including said outlet means extending outwardly therefrom.

3. The apparatus as claimed in claim 2, wherein said first member comprises at least one slot located on and extending through at least one of said co-operating members for accepting said second member.

4. The apparatus as claimed in claim 3, wherein the at least one slot is disposed substantially circumferentially of at least one co-operating member.

5. The apparatus as claimed in claim 4, wherein said discrete sealing means to be interposed between said pipe and said engagement means includes an aperture adapted, in use, to be disposed co-axially with the aperture of said at least one co-operating member.

6. The apparatus as claimed in claim 5, wherein said second member includes at least one grommet extending substantially normally from said discrete sealing means, and said at least one grommet being releasably lockingly insertable into the at least one slot whereby to prevent unwanted separation under pressure of said discrete sealing means from said engagement means.

7. The apparatus as claimed in claim 6, wherein said engagement means are constructed of a metallic material.

8. The apparatus as claimed in claim 7, wherein said discrete sealing means is constructed of a resilient material.

9. The apparatus as claimed in claim 6, wherein said at least one grommet includes a tapered portion disposed, in use, to be snap-fitted in said at least one slot whereby to prevent unwanted separation under pressure of said discrete sealing means from said engagement means.

10. The apparatus as claimed in claim 1, wherein free ends of said discrete sealing means are tapered for forming wedging means whereby to give rise to a wedging action relative to said engagement means and said pipe.

11. The apparatus as claimed in claim 10, wherein said outlet means of said engagement means has a slot extending substantially radially thereof, said slot being adapted, in use, to receive and releasably retain a valve blade member, of a cross-sectional shape complementary to said slot whereby to allow for removable sealing of said outlet means.

12. The apparatus as claimed in claim 11, including a further sealing means to be disposed within said slot for sealing said slot.

13. The apparatus as claimed in claim 12, including a bush adapted, in use, to be interposed between said engagement means and said discrete sealing means, said bush having an internal thread at at least the upper end thereof whereby to allow for connection thereof with said further conduit.

14. A method of tapping an existing fluid pipe, without interrupting flow of fluid therethrough, said method including: positively releasably retaining discrete sealing means on a tapping band in a predetermined desired relation aligned with outlet means on said band whereby to prevent unwanted separation under pressure of said discrete sealing means from said engagement means by releasably projecting and interengaging a first member located on one of said tapping band and discrete sealing means with a second member located on the other of said tapping band and said discrete sealing means; disposing said tapping band around said pipe, such that said discrete sealing means is sealingly located between said pipe and said band, said outlet means extending from said band and adapted to co-operate with a secondary conduit, said outlet means defining an intended region for tapping of said pipe, said outlet means having second sealing means associated therewith for sealing of said outlet means; tapping said pipe using said second sealing means to seal said pipe once tapping has been achieved; connecting a further conduit to said pipe via said outlet means; and withdrawing said second sealing means whereby to allow for fluid flow into said further conduit.

* * * * *